L. LIBBMAN.
ASH SIFTER.
APPLICATION FILED JAN. 31, 1910.

1,036,280.

Patented Aug. 20, 1912.

Witnesses:

Inventor:
Lewis Libbman,
by Howard A. Coombs
his Attorney.

UNITED STATES PATENT OFFICE.

LOUIS LIBBMAN, OF EVERETT, MASSACHUSETTS, ASSIGNOR TO GEM MANUFACTURING COMPANY, OF CHELSEA, MASSACHUSETTS, A CORPORATION OF MASSACHUSETTS.

ASH-SIFTER.

1,036,280.

Specification of Letters Patent. Patented Aug. 20, 1912.

Application filed January 31, 1910. Serial No. 541,011.

*To all whom it may concern:*

Be it known that I, LOUIS LIBBMAN, a citizen of the United States, residing at Everett, in the county of Middlesex and State of Massachusetts, have invented an Improvement in Ash-Sifters, of which the following description, in connection with the accompanying drawings, is a specification, like letters on the drawings representing like parts.

My invention is an ash sifter, having for its object economy, simplicity and convenience of construction, and convenience of operation.
The constructional details and the various advantages of my invention will be more apparent from the following description taken with reference to the accompanying drawing, in which I have shown one of many possible embodiments of my invention.

Figure 1:
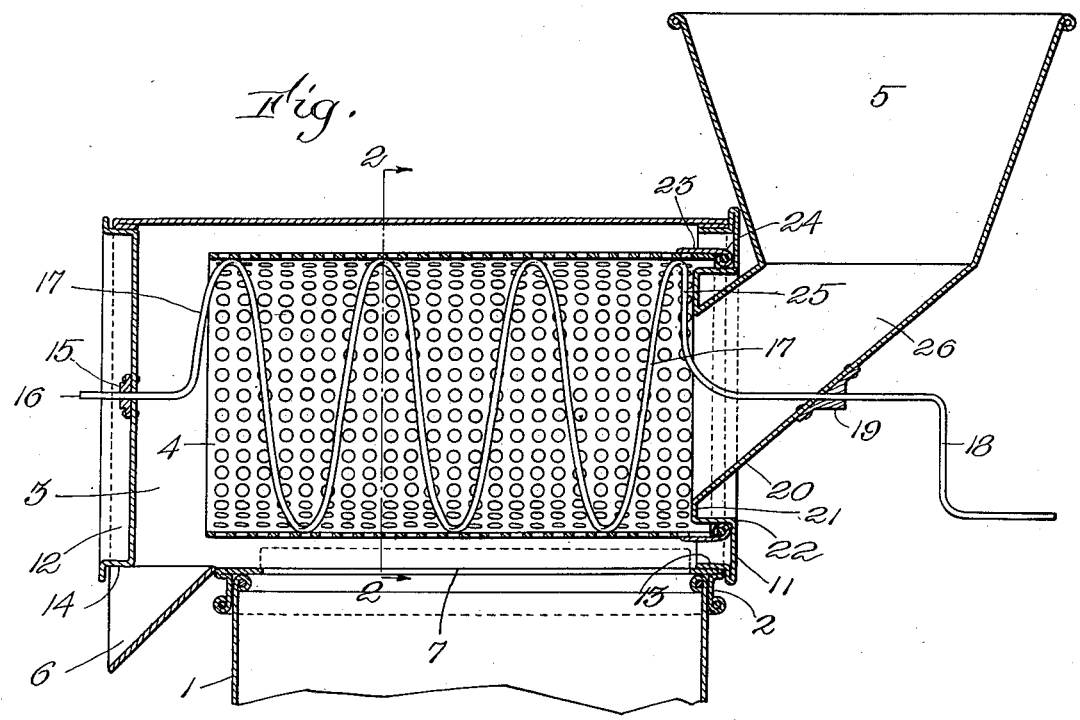
Figure 2:
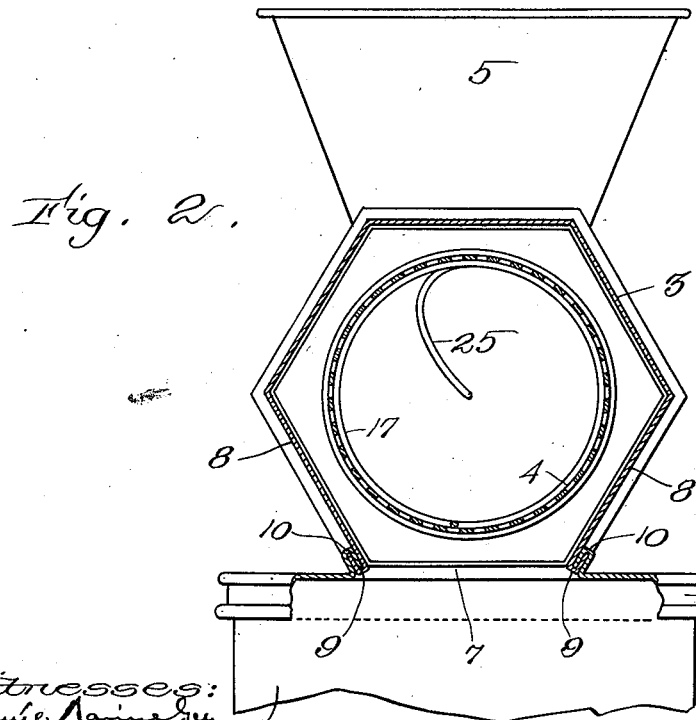

In the drawing, Figure 1 is a central vertical longitudinal sectional view; Fig. 2 is a cross-sectional view taken approximately on the line 2—2, Fig. 1.
My ash sifter is intended for use with a usual ash receptacle 1, and for this purpose is provided with a correspondingly shaped cover 2 to fit down over the open top of the ash receptacle. The ash sifter consists, broadly speaking, of an outer casing or jacket 3, an inner longitudinally extending sieve or rotary screen 4, a hopper 5 at one end, an outlet 6 for the cinders at the opposite end, and an intervening outlet or ashes-opening 7 in the ash-receptacle cover beneath the sieve 4, and one of the leading features of my invention resides in providing the outer casing or jacket with opposite inclined walls 8 on its lower side, which have a large number of advantages, one being that they direct the ashes positively and certainly into the receptacle and prevent any possibility of the ashes lodging as in the case of a cylindrical casing, and another advantage being that the hexagonal or other polygonal shape in cross-section is much more economical in material and process of manufacture and permits an open-bottom construction which may be positively secured on the cover without the use of rivets or other fastening means, simply by jointing the parts in such a manner that the casing may be slid onto the cover or removed therefrom, as best shown in Fig. 2, where it will be seen that the casing consists of a piece of sheet metal bent around to constitute five sides of the casing and upturned at 9 at its opposite longitudinal edges, which fit into over-turned flanges 10 formed at the edges of the opening 7 in the cover, the result being that the casing has its upturned flanges or edges 9 simply inserted in the coöperating flanges 10 of the cover 2 and then the parts are slid forward into the position shown in Fig. 1. with the result that the ash sifter casing is thereby mounted in correct position and yet is practically immovable and held permanently as desired. The opposite ends 11, 12, of the casing fit tightly in the casing and each is set in or provided with a deep flange 13, 14, for giving strength and making a tight joint. The end 12 has a bearing 15 for the projecting end 16 of the sieve carrier wire 17, which is herein shown as bent spirally and slipped tightly into the cylindrical sieve 4 (and if necessary soldered, although this is not usually necessary). The handle end 18 of the wire or rod 17 is journaled at 19 in the hopper 5, said hopper being permanently united for example, by electric welding with the end 11.

A special feature of my invention resides in the formation of the connection between the hopper 5 and the end 11. Viewing Fig. 1, it will be seen that the throat portion of the hopper extends inwardly beyond the face of the end 11 as indicated at 20 and thence has a circular vertical flange 21 connecting with the horizontal shoulder 22 of the end 11. This construction gives great bracing strength to resist the tendency of the hopper when heavily loaded to buckle or bend outward, deform the end 11, tend to make the sieve bind, and disarrange and distort the sifter generally. The necessary stiffness has heretofore been usually provided in ash sifters by braces, angle irons, riveting or other comparatively expensive, cumbersome and heavy arrangement, whereas I secure the requisite strength simply by the formation or bending of the metal sheet which constitutes the throat of the hopper, and the end of the ash sifter.
The adjacent end of the sieve or screen is provided with a heavy metal hoop 23 rolled over and reinforced at 24, which fits over the shoulder or projection 22 of the end and serves to center the sieve and take the weight off from the handle and the bearing 19. The hoop closes the holes at the end of the sieve so that the ashes can not escape from the sieve until they get over the opening 7 and the rolled over edge 24 of the hoop serves to keep the joint tight and therefore keep the ashes in the sieve. The flange 21 constitutes at its lower side a drop for the ashes so that there is no tendency of the ashes to lodge in the hopper but they are practically compelled to drop from the throat of the hopper directly into the sieve. The down-turned end of the handle 18 is on the opposite side from the adjacent radially connecting portion 25 of the rod 17 at the end of the sieve, so that thereby the sieve naturally assumes the position shown in Fig. 1 when at rest, which leaves an open space 26 at the lower bottom end of the throat of the hopper so that thereby the wire or rod 17 is not in the way of the ashes so as to interfere with their sliding downwardly freely when poured into the hopper.

From the above description it will be seen that although my ash sifter requires no soldering or riveting, it is exceedingly strong and simple, readily taken apart and put together, and is clean and neat in operation. There are no corners or places where the ashes are liable to lodge and the construction calls for a minimum amount of sheet metal.

Having described my invention, what I claim as new and desire to secure by Letters Patent of the United States, is, 1. An ash-sifter, comprising a receptacle-cover, having a rectangular opening therein, the longitudinal edges of which are bent upwardly and then downwardly to form guides, a casing, polygonal in vertical cross-section and having its bottom side removed to form an opening corresponding to the opening in said receptacle cover, the longitudinal edges of said casing opening being bent outwardly and upwardly to fit slidably in said guides, whereby no obstruction is offered to ashes falling through said opening, and a rotary sieve mounted in said casing.

2. In an ash sifter, a casing having an open inlet end, a hopper terminating in a flanged end removably fitting said casing, said removable end having an inwardly extending internal shoulder, a rotary sieve inclosing said internal shoulder, a circular radial flange extending from said internal shoulder toward the axis of said sieve and verging at its inner edge outwardly into said hopper, thereby forming a drop at its lower side from the hopper into said sieve for directing the ashes beyond the joint between the sieve and the removable end and providing strength and bracing construction for the removable end and hopper.

In testimony whereof, I have signed my name to this specification, in the presence of two subscribing witnesses.

LOUIS LIBBMAN.

Witnesses:
F. D. FULLER.
GEO. F. HIGGINS.